United States Patent
Kim

(10) Patent No.: US 10,054,808 B2
(45) Date of Patent: Aug. 21, 2018

(54) DISPLAY CHASSIS AND DISPLAY DEVICE COMPRISING THE SAME

(71) Applicant: SAMSUNG DISPLAY CO., LTD., Yongin, Gyeonggi-Do (KR)

(72) Inventor: Yong Il Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 70 days.

(21) Appl. No.: 14/599,413

(22) Filed: Jan. 16, 2015

(65) Prior Publication Data

US 2015/0286088 A1    Oct. 8, 2015

(30) Foreign Application Priority Data

Apr. 3, 2014   (KR) .................. 10-2014-0040037

(51) Int. Cl.
*F21V 8/00*        (2006.01)
*G02F 1/1333*      (2006.01)

(52) U.S. Cl.
CPC ..... *G02F 1/133308* (2013.01); *G02B 6/0031* (2013.01); *G02B 6/0088* (2013.01); *G02F 2001/133314* (2013.01)

(58) Field of Classification Search
CPC ... G02F 1/133308; G02F 2001/133314; G02F 2001/133322; G02F 2001/133325; G02F 2001/133331; G02F 1/133305
See application file for complete search history.

(56) References Cited

U.S. PATENT DOCUMENTS

| | | |
|---|---|---|
| 4,891,016 A | 1/1990 | Luzzi et al. |
| 5,495,389 A | 2/1996 | Dewitt et al. |
| 7,916,238 B2 | 3/2011 | Bae et al. |
| 2003/0128307 A1* | 7/2003 | Ito ................ G02F 1/133308 349/58 |
| 2009/0015747 A1* | 1/2009 | Nishizawa ........ G02F 1/133308 349/58 |
| 2011/0304792 A1 | 12/2011 | Lee et al. |
| 2012/0182493 A1 | 7/2012 | Hwang et al. |
| 2013/0107143 A1* | 5/2013 | Dighde ............ G02F 1/133308 349/1 |

(Continued)

FOREIGN PATENT DOCUMENTS

| | | |
|---|---|---|
| KR | 1995-0012468 B1 | 10/1995 |
| KR | 10-1994-0022409 B1 | 4/1998 |
| KR | 10-2005-0051360 A | 6/2005 |

(Continued)

OTHER PUBLICATIONS

Korean Patent Abstract for KR 10-2000-0023007 A, which corresponds to KR Publ. No. 10-0673679 B1, published Apr. 25, 2000, 1 page.

(Continued)

*Primary Examiner* — Jessica M Merlin
(74) *Attorney, Agent, or Firm* — Lewis Roca Rothgerber Christie LLP

(57) ABSTRACT

A display chassis including a bottom part having a curved surface, a first sidewall and a second sidewall extending from opposite ends of the bottom part and facing each other, and shape maintaining parts configured to maintain shapes of the first sidewall and the second sidewall and contacting the first sidewall and the second sidewall, respectively.

16 Claims, 11 Drawing Sheets

(56) References Cited

U.S. PATENT DOCUMENTS

2013/0208507 A1    8/2013  Kim et al.
2013/0329162 A1*  12/2013  Fujii .................... H05K 7/14
                                                        349/58

FOREIGN PATENT DOCUMENTS

| KR | 10-0673679 B1 | 1/2007 |
| KR | 10-0760213 B1 | 9/2007 |
| KR | 10-0981024 B1 | 9/2010 |
| KR | 10-2011-0134029 A | 12/2011 |
| KR | 10-2011-0139076 A | 12/2011 |
| KR | 10-2013-0019224 A | 2/2013 |

OTHER PUBLICATIONS

Korean Patent Abstract for KR 10-2009-0073594 A, which corresponds to KR Publ. No. 10-0981024 B1, published Jul. 3, 2009, 1 page.

* cited by examiner

DISPLAY CHASSIS AND DISPLAY DEVICE COMPRISING THE SAME

CROSS-REFERENCE TO RELATED APPLICATION

This application claims priority to and the benefit of Korean Patent Application No. 10-2014-0040037, filed on Apr. 3, 2014 in the Korean Intellectual Property Office, the content of which is incorporated herein by reference in its entirety.

BACKGROUND

1. Field

The present invention relates to a display chassis (e.g., a bottom chassis) and a display device including the same.

2. Description of the Related Art

Liquid crystal displays have been adopted as displays for use in televisions and are continuously being developed to have wider sizes. The increasing size of the screen, however, causes an increased difference of viewing angles between when the viewer watches the center and when he or she watches left and right sides of the screen. Throughout the description, the term "viewing angle" as used herein may be defined as an angle between the line of sight of the viewer who views the screen and a line tangent to the viewed screen, and the expression "viewing angle difference" as used herein is defined as a difference between the center and left/right edge viewing angles. Another shortcoming of a wide-screen liquid crystal display is increasing glare (e.g., glare-off). These drawbacks associated with the difference of viewpoints can be dealt with by curving in the screen. However, when curved, the display panel is subject to stress ("curvature stress"), which then leads to reduced or defective display performance as a result of problems, such as a black mura defect or yellowish defect. In addition, the curvature of the display surface may not be maintained at a constant curvature due to an elastic recovery force as the result of the curving. Accordingly, various technical attempts for solving the problems are being made.

SUMMARY

Aspects of embodiments of the present invention are directed toward a display chassis (e.g., a bottom chassis) which can be firmly maintained in a curved state.

Aspects of embodiments of the present invention also directed toward a display device which can be firmly maintained in a curved state.

Aspects of embodiments of the present invention also directed toward a display chassis which can suppress a spring back phenomenon.

Aspects of embodiments of the present invention also directed toward a display device which can suppress a spring back phenomenon.

These and other aspects and characteristics of the present invention will be described in or will become apparent from the following description of example embodiments.

According to an embodiment of the present invention, a display chassis (e.g., a bottom chassis) includes a bottom part having a curved surface, a first sidewall and a second sidewall extending from opposite ends of the bottom part and facing each other, and shape maintaining parts configured to maintain shapes of the first sidewall and the second sidewall and contacting the first sidewall and the second sidewall, respectively.

According to another embodiment of the present invention, a display device includes a display chassis and a display panel on the chassis, the chassis including a bottom part having a curved surface, a first sidewall and a second sidewall extending from opposite ends of the bottom part and facing each other, and shape maintaining parts configured to maintain shapes of the first sidewall and the second sidewall and contacting the first sidewall and the second sidewall, respectively.

Aspects of embodiments of the present invention provide at least the following effects.

For example, according to aspects of embodiments of the present invention, a curved state of a display chassis (e.g., a boom chassis) can be firmly (e.g., stably) maintained.

In addition, a curved surface of a curved display device can be firmly maintained at a constant level of curvature.

BRIEF DESCRIPTION OF THE DRAWINGS

The above and other features and characteristics of the present invention will become more apparent by describing, in detail, example embodiments thereof with reference to the attached drawings in which.

DETAILED DESCRIPTION

Figure 1:
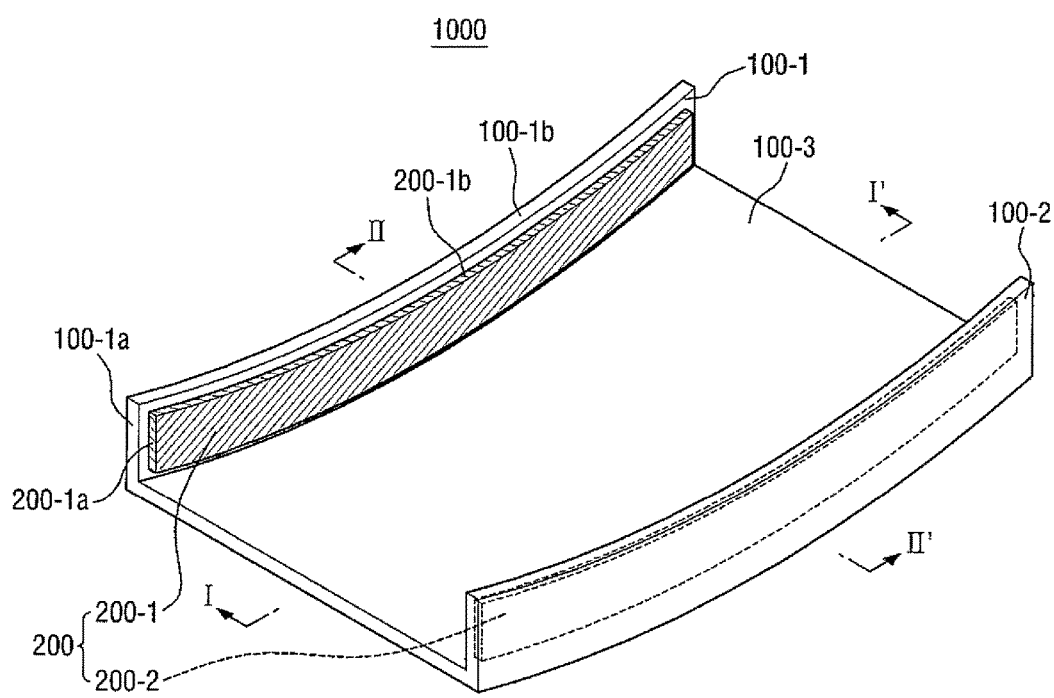
FIG. 1 is a partial perspective view of a display chassis (e.g., a bottom chassis) according to an embodiment of the present invention.

The aspects and characteristics of the present invention and methods for achieving the aspects and characteristics will be apparent by referring to the embodiments to be described in detail with reference to the accompanying drawings. However, the present invention is not limited to the embodiments disclosed hereinafter and can be implemented in diverse forms. The matters defined in the description, such as the detailed construction and elements, are merely details provided to assist those of ordinary skill in the art in a comprehensive understanding of the invention, and the present invention is defined by the scope of the appended claims and their equivalents.

The term "on" that is used to designate that an element is on another element or located on a different layer or a layer includes both a case in which an element is located directly on another element or a layer and a case in which an element is located on another element via another layer or still another element. In the entire description of the present invention, the same drawing reference numerals are used for the same elements across various figures.

Although the terms "first", "second", and so forth are used to describe diverse constituent elements, such constituent elements are not limited by these terms. These terms are used only to discriminate a constituent element from other constituent elements. Accordingly, in the following description, a first constituent element may be a second constituent element. Further, the use of "may" when describing embodiments of the present invention relates to "one or more embodiments of the present invention."

Hereinafter, embodiments of the present invention will be described with reference to the attached drawings.

Figure 2:
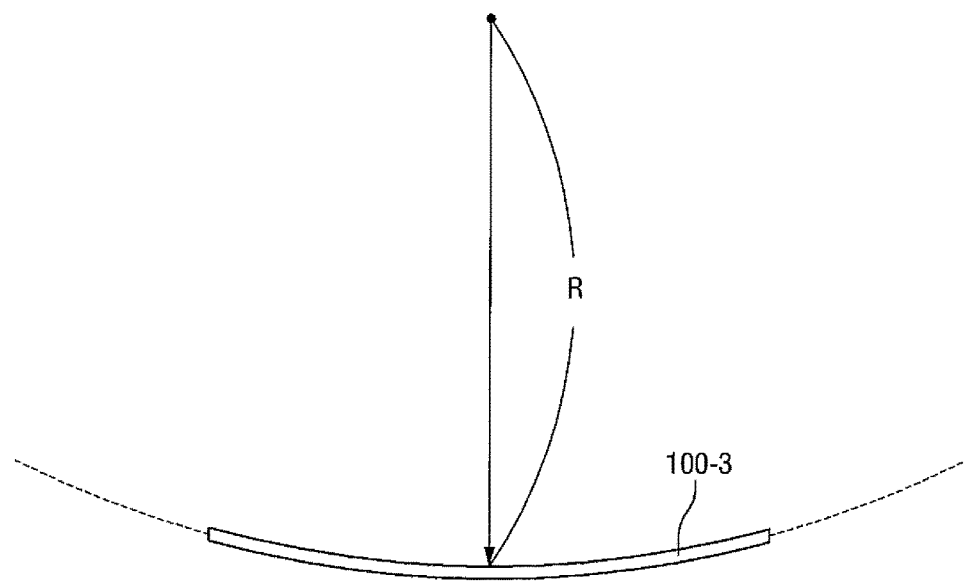
FIG. 2 is a cross-sectional view taken along the line I-I' of FIG. 1.
Figure 3:
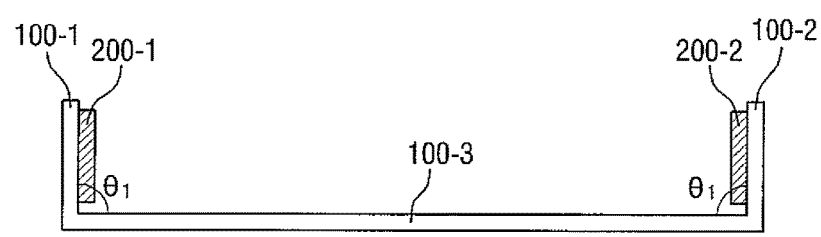
FIG. 3 is a cross-sectional view taken along the line II-II' of FIG. 1.

FIG. 1 is a partial perspective view of a display chassis (e.g., a bottom or rear chassis) according to an embodiment of the present invention, FIG. 2 is a cross-sectional view taken along the line I-I' of FIG. 1, and FIG. 3 is a cross-sectional view taken along the line II-II' of FIG. 1.

Referring to FIGS. 1 to 3, the display chassis according to an embodiment of the present invention includes a bottom part 100-3 having a curved surface, a first sidewall 100-1 and a second sidewall 100-2 extending from opposite sides of the bottom part 100-3 and facing each other, and shape maintaining parts 200 maintaining shapes of the first sidewall and the second sidewall while making contact with the first sidewall and the second sidewall, respectively.

The bottom part 100-3 may provide a space where (or in which) various components of a display device, including a display panel, etc., to be further described later, are mounted. That is to say, the bottom part 100-3 may be plate shaped, and various components of a display device may be mounted on the bottom part 100-3.

In an example embodiment, a planar shape of the bottom part 100-3 may be rectangular. Accordingly, other components of the display device may also have rectangular, planar shapes, but the present invention does not limit the shapes of the bottom part 100-3 and other components thereto.

The bottom part 100-3 may be flexible. For example, the bottom part 100-3 may be bendable to a certain extent or degree. The flexibility of the bottom part 100-3 may be ascribed to a material or a thickness of the bottom part 100-3. The bottom part 100-3 may be made of a thin metal or plastic but is not limited thereto.

In an example embodiment, the bottom part 100-3 may be fixed in a curved state. For example, the bottom part 100-3 may have a curved surface.

The bottom part 100-3 may have a curved surface that is upwardly convexly curved when viewed towards a top surface of the bottom part 100-3. For example, a section of the bottom part 100-3 taken along a direction parallel to a x-axis (e.g., along a length direction of the bottom part 100-3) may have an upwardly convex parabola shape (see FIG. 2).

The bottom part 100-3 may have a constant curvature but aspects of the present invention are not limited thereto. The bottom part 100-3 may include a plurality of areas which may each have a different curvature.

FIG. 2 illustrates an embodiment in which the bottom part 100-3 has a constant curvature, which is, however, provided only for illustration. As described above, the present invention does not limit the curved pattern of the bottom part 100-3 to that illustrated herein.

The bottom part 100-3 may have curved lines (e.g., curved portions) at its opposite side ends. For example, the opposite side ends of the bottom part 100-3 are formed as curved lines and the remaining sides of the bottom part 100-3, excluding the opposite side ends, are formed as straight lines (e.g., as straight portions).

The first sidewall 100-1 and the second sidewall 100-2 may extend from the opposite side ends of the bottom part 100-3. In addition, the first sidewall 100-1 and the second sidewall 100-2 may face each other.

The first sidewall 100-1 and the second sidewall 100-2 may upwardly extend from the opposite side ends of the bottom part 100-3. For example, the first sidewall 100-1 and the second sidewall 100-2 may each form a first angle $\theta 1$ with respect to the bottom part 100-3 (see FIG. 3). In an example embodiment, the first angle $\theta 1$ may be a right angle. That is to say, the first sidewall 100-1 and the second sidewall 100-2 may vertically extend from the bottom part 100-3, which is, however, provided only for illustration. The first angle $\theta 1$ is not limited to the right angle. In another example embodiment, the first angle $\theta 1$ may be an obtuse angle.

The first sidewall 100-1 and the second sidewall 100-2 may have substantially the same shape. Thus, only the first sidewall 100-1 may be described, and a description of the second sidewall 100-2 may not be given.

The first sidewall 100-1 may have long sides 100-1*b* extending along side ends of the bottom part 100-3, and short sides 100-1*a* extending from the opposite side ends of the long side 100-1*b*. For example, the first sidewall 100-1 may have two long sides 100-1*b* facing each other and two short sides 100-1*a* facing each other and disposed at ends of the two long sides 100-1*b*.

The two long sides 100-1*b* may be curved parallel to the opposite side ends of the bottom part 100-3, and the two short sides 100-1*a* may be straight and extend upwardly from the bottom part 100-3.

In an example embodiment in which the opposite side ends of the bottom part 100-3 are curved with a constant curvature, the two long sides 100-1*b* have the same curvature as that of the opposite side ends of the bottom part 100-3. Accordingly, the opposite side ends of the bottom part 100-3 and one of long sides of the first sidewall 100-1 and the second sidewall 100-2 may overlap each other.

The shape maintaining parts 200 may maintain shapes of the first sidewall 100-1 and the second sidewall 100-2. When the long sides of the first sidewall 100-1 and the second sidewall 100-2 are curved, the curvature of the long sides may be reduced due to a spring-back phenomenon. The spring-back phenomenon refers to a phenomenon that occurs when a material is curved during a curving process and a pressure is then removed such that a curvature of the material is reduced due to an elastic recovery action.

If the curvature of the long side is reduced due to the spring-back, the curvature of the bottom part 100-3 may also be affected and may not be maintained at a constant level. Therefore, when the shape maintaining parts 200 are disposed on the first sidewall 100-1 and/or the second sidewall 100-2, the shapes of the first sidewall 100-1 and the second sidewall 100-2 are constantly maintained. Accordingly, the curved shape of the bottom part 100-3 can be constantly maintained.

In order to maintain the curved state, the shape maintaining parts 200 may be made of a rigid material. In an example embodiment, the shape maintaining parts 200 may be made of a metal material but are not limited thereto.

In an example embodiment, the shape maintaining parts 200 may make contact with the first sidewall 100-1 and the second sidewall 100-2. FIG. 1 illustrates an embodiment in which a shape maintaining part 200 makes contact with the first sidewall 100-1 and the second sidewall 100-2, respectively, but aspects of the present invention are not limited thereto. For example, more than one of the shape maintaining parts 200 may be disposed to contact the first sidewall 100-1 and the second sidewall 100-2, respectively.

The shape maintaining parts 200 may be fastened to the first sidewall 100-1 and the second sidewall 100-2. The present invention does not limit the fastening method of the shape maintaining parts 200 with the first sidewall 100-1 and the second sidewall 100-2, and various mechanical and chemical methods may be employed.

For the sake of convenient explanation, the shape maintaining part 200 corresponding to the first sidewall 100-1 is referred to as a first shape maintaining part 200-1, and the shape maintaining part 200 corresponding to the second sidewall 100-2 is referred to as a second shape maintaining part 200-2.

The first shape maintaining part 200-1 will now be described in more detail with reference to FIG. 4.

Figure 4:
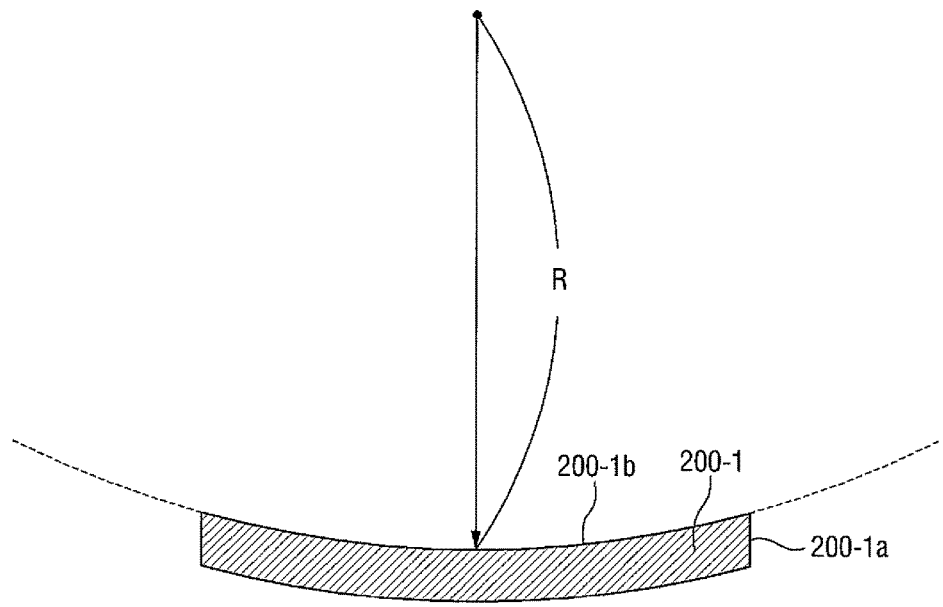
FIG. 4 is a partial plan view of the display chassis shown in FIG. 1.

FIG. 4 is a partial plan view of the display chassis shown in FIG. 1.

The first shape maintaining part 200-1 is substantially the same as the second shape maintaining part 200-2. Thus, the first shape maintaining part 200-1 will now be described, and a description of the second shape maintaining part 200-2 may not be given.

The first shape maintaining part 200-1 may come into contact with the first sidewall 100-1. For example, the first shape maintaining part 200-1 may be disposed to overlap with the first sidewall 100-1. A size of the first shape maintaining part 200-1 may be substantially equal to or smaller than a size of the first sidewall 100-1. FIG. 1 illustrates a case in which the first shape maintaining part 200-1 is smaller than the first sidewall 100-1 in size, but aspects of the present invention are not limited thereto.

The first shape maintaining part 200-1 may have substantially the same shape as that of the first sidewall 100-1. For example, the first shape maintaining part 200-1 may resemble the first sidewall 100-1 in terms of shape.

For example, the first shape maintaining part 200-1 may have long sides 200-1b extending parallel to the long sides 100-1b of the first sidewall 100-1 and short sides 200-1a extending parallel to the short sides 100-1a of the first sidewall 100-1.

In an example embodiment, the long side 200-1b of the first shape maintaining part 200-1 may have substantially the same curvature as the long side 100-1b of the first sidewall 100-1, and the curvature of the first sidewall 100-1 can be maintained at a constant level, which is, however, provided only for illustration. The present invention does not limit the shape of the first shape maintaining part 200-1 to that illustrated in FIG. 1.

In an example embodiment, the shape maintaining parts 200 may be formed by a blanking process. In such a case, the elastic recovery force is less than in a case in which the shape maintaining parts 200 are formed by a curving process (e.g., a pressing process), thereby more effectively maintaining the curvatures of the first sidewall 100-1 and the second sidewall 100-2.

The shape maintaining parts 200 may be disposed on inner surfaces of the first sidewall 100-1 and the second sidewall 100-2, respectively. For example, the shape maintaining parts 200 are disposed on inner surfaces of the first sidewall 100-1 and the second sidewall 100-2 respectively, so that they may not be visible by a user from outside of a final product.

For the sake of convenient explanation, the shape of a display chassis is described by illustrating only the bottom part 100-3, the first sidewall 100-1. and the second sidewall 100-2 in FIGS. 1 to 3, but the shape of the bottom chassis is not limited thereto. The bottom chassis may further include a third sidewall and a fourth sidewall facing each other and respectively contacting opposite ends of the first sidewall 100-1 and the second sidewall 100-2.

Figure 5:
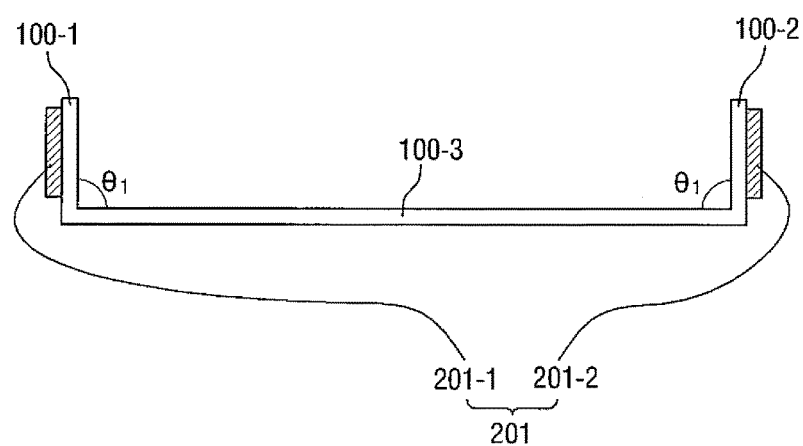
FIG. 5 is a cross-sectional view of a display chassis according to another embodiment of the present invention.

FIG. 5 is a cross-sectional view of a display chassis according to another embodiment of the present invention.

Referring to FIG. 5, the display chassis according to another embodiment of the present invention is different from the display chassis shown in FIG. 3 in that shape maintaining parts are disposed on outer surfaces of a first sidewall 100-1 and a second sidewall 100-2.

In an example embodiment, the shape maintaining parts 201 may be formed on or disposed on outer surfaces of the first sidewall 100-1 and the second sidewall 100-2, respectively. For example, a first shape maintaining part 201-1 may be disposed to be in contact with the outer surface of the first sidewall 100-1, and a second shape maintaining part 201-2 may be disposed to be in contact with the outer surface of the second sidewall 100-2.

Figure 6:
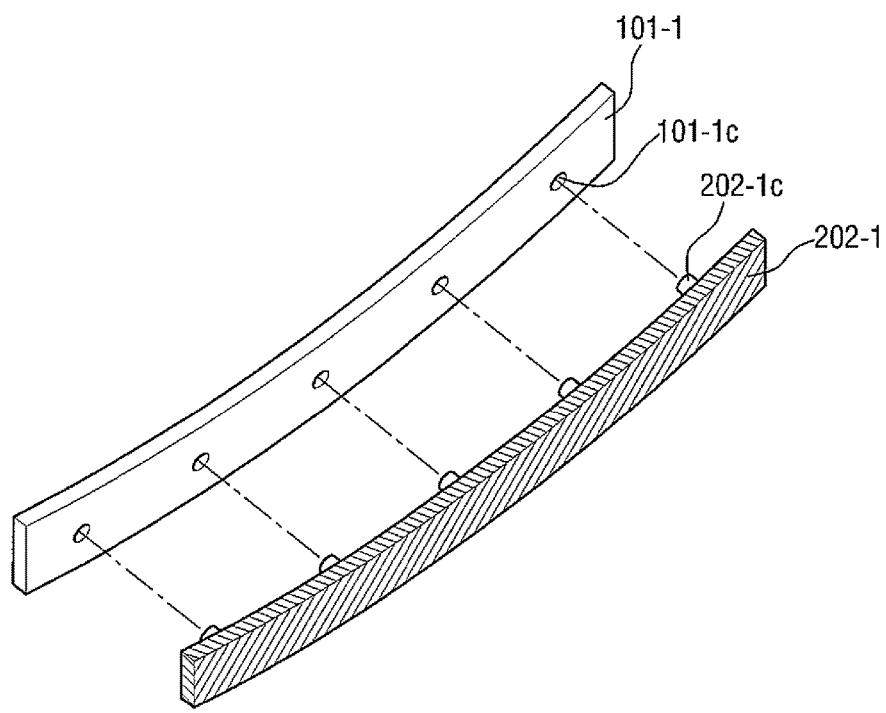
FIG. 6 is a partially exploded perspective view of a display chassis according to another embodiment of the present invention.
Figure 7:
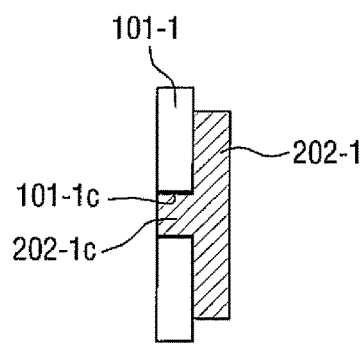
FIG. 7 is a partial cross-sectional view of FIG. 6.

FIG. 6 is a partially exploded perspective view of a display chassis according to another embodiment of the present invention, and FIG. 7 is a partial cross-sectional view of FIG. 6.

Referring to FIGS. 6 and 7, in the display chassis according to another embodiment of the present invention, sidewalls may be fastened to shape maintaining parts in a forced interference manner.

In an example embodiment, a first shape maintaining part 202-1 may be fastened to a first sidewall 101-1 in a forced interference manner. The first sidewall 101-1 may include a plurality of insertion holes 101-1c arranged to be spaced apart from each other (e.g., to be spaced apart from each other by a set or predetermined distance). In addition, the first shape maintaining part 202-1 may include a plurality of insertion protrusions 202-1c arranged to be spaced apart from each other (e.g., to be spaced apart from each other by a set or predetermined distance) so as to correspond to the plurality of insertion holes 101-1c. For example, the plurality of insertion protrusions 202-1c included in the first shape maintaining part 202-1 are inserted into the plurality of insertion holes 101-1c included in the first sidewall 101-1, thereby fastening the first shape maintaining part 202-1 with the first sidewall 101-1. For example, the first shape maintaining part 202-1 and the first sidewall 101-1 may be fastened to each other in a forced interference manner. To this end, the insertion protrusions 202-1c may have a stepped sill structure but is not limited thereto.

A second shape maintaining part may be fastened to a second sidewall. Because the second shape maintaining part and the second sidewall are fastened to each other in substantially the same manner as the fastening method of the first shape maintaining part 202-1 and the first sidewall 101-1, a detailed description thereof may not be given.

Figure 8:
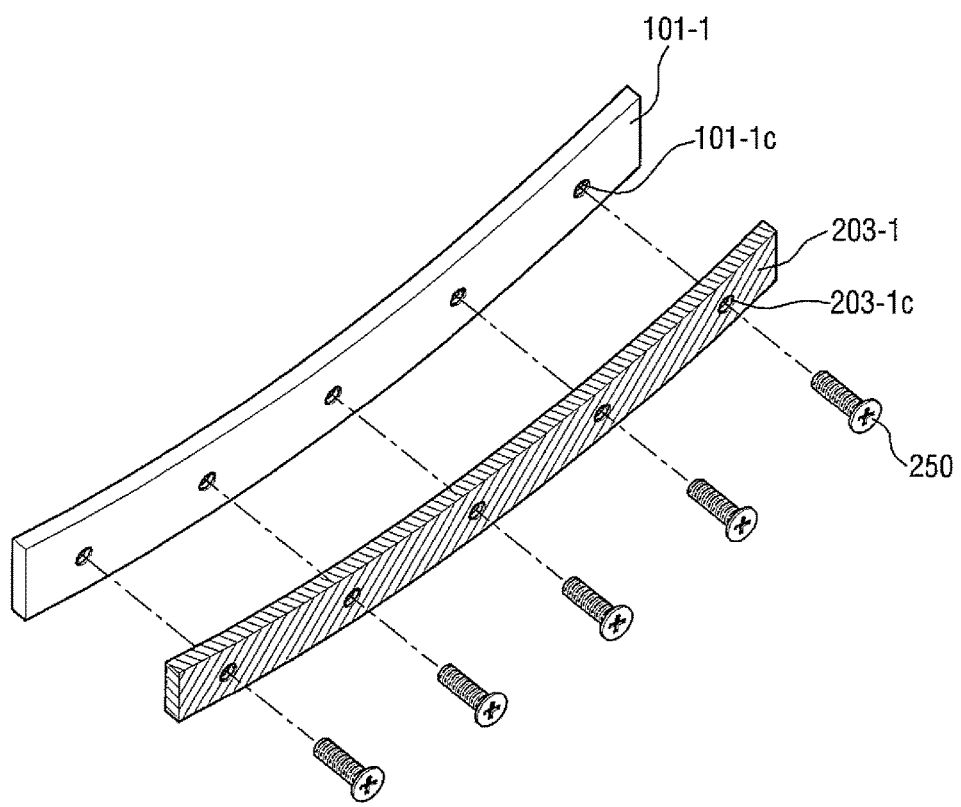
FIG. 8 is a partially exploded perspective view of a display chassis according to another embodiment of the present invention.

FIG. 8 is a partially exploded perspective view of a display chassis according to another embodiment of the present invention.

Referring to FIG. 8, the display chassis according to another embodiment of the present invention is different from the display chassis shown in FIG. 6 in that a shape maintaining part is fastened to a sidewall in a screw tightening manner.

in an example embodiment, a first sidewall 101-1 and a first shape maintaining part 203-1 may be fastened to each other in a screw tightening manner.

To this end, each of the first sidewall 101-1 and the first shape maintaining part 203-1 may include fastening holes into which screws are inserted. Fastening holes 101-1c of the first sidewall 101-1 may be arranged to be spaced apart from each other (e.g., to be spaced apart from each other by a set or predetermined distance). Fastening holes 203-1c of the first shape maintaining part 203-1 may be arranged to be spaced apart from each other (e.g., to be spaced apart from each other by a set or predetermined distance). The fastening holes 101-1c of the first sidewall 101-1 and the fastening holes 203-1c of the first shape maintaining part 203-1 may correspond to each other. For example, a same number of the fastening holes 101-1c of the first sidewall 101-1 and the fastening holes 203-1c of the first shape maintaining part 203-1 may be formed, and the fastening holes 101-1c of the first sidewall 101-1 and the fastening holes 203-1c of the first shape maintaining part 203-1 may overlap with each other. In a state in which the fastening holes 101-1c of the first sidewall 101-1 and the fastening holes 203-1c of the first shape maintaining part 203-1 overlap with each other, screws 250 may be inserted into the fastening holes 101-1c of the first sidewall 101-1 and into the fastening holes 203-1c of the first shape maintaining part 203-1, thereby fastening and fixing the first shape maintaining part 203-1 to the first sidewall 101-1.

A second shape maintaining part may be fastened to a second sidewall. Because the second shape maintaining part and the second sidewall are fastened to each other in substantially the same manner as the fastening method of the first shape maintaining part 203-1 and the first sidewall 101-1, a detailed description thereof may not be given.

Figure 9:
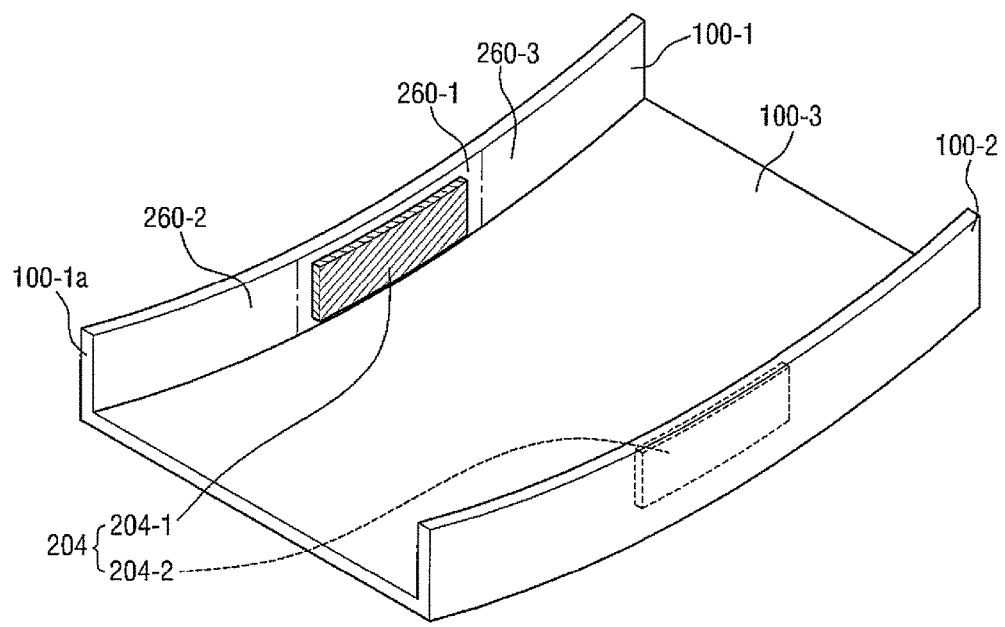
FIG. 9 is a partial perspective view of a display chassis according to another embodiment of the present invention.

FIG. 9 is a partial perspective view of a display chassis according to another embodiment of the present invention.

Referring to FIG. 9, the display chassis according to another embodiment of the present invention is different from the display chassis shown in FIG. 1 in that a shape maintaining part is disposed at only a central portion of a sidewall.

In an example embodiment, shape maintaining parts 204 may be disposed at central areas 260-1 of a first sidewall 100-1 and a second sidewall 100-2, respectively. In an example embodiment, the central areas 260-1 of the first sidewall 100-1 and the second sidewall 100-2 may be areas corresponding to central portions when the first sidewall 100-1 and the second sidewall 100-2 are divided into three parts having the same area. For example, each of the first sidewall 100-1 and the second sidewall 100-2 may include two edge areas 260-2 and 260-3 and a central area 260-1 disposed between the two edge areas 260-2 and 260-3.

The shape maintaining parts 204 may be disposed at or in the central areas 260-1. For example, a width of the shape maintaining parts 204 may be substantially equal to or less than a width of the central areas 260-1.

Figure 10:
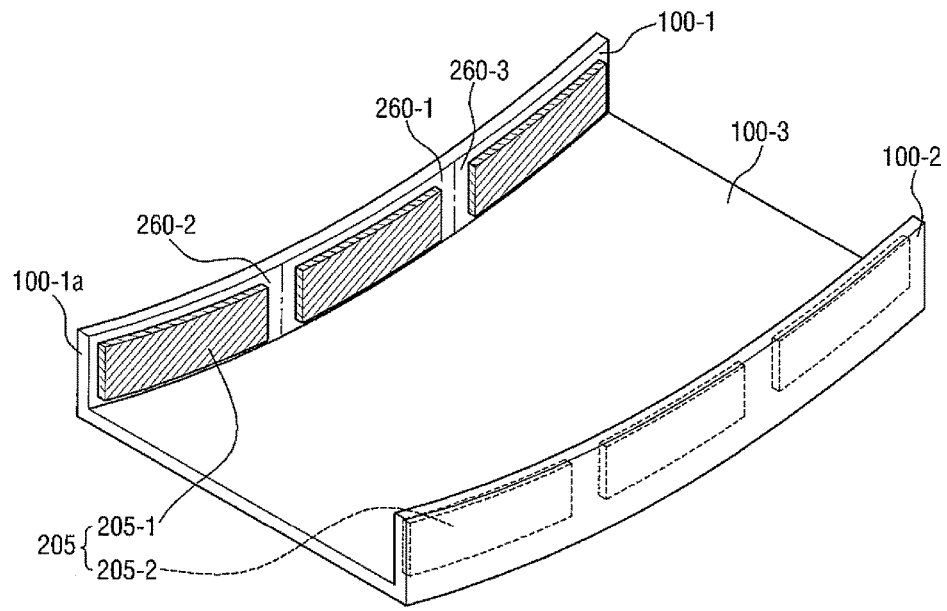
FIG. 10 is a partial perspective view of a display chassis according to another embodiment of the present invention.

FIG. 10 is a partial perspective view of a display chassis according to another embodiment of the present invention.

Referring to FIG. 10, the display chassis according to another embodiment of the present invention is different from the display chassis shown in FIG. 1 in that shape maintaining parts are arranged to be spaced apart from each other.

In an example embodiment, a plurality of shape maintaining parts 205-1 are provided and are arranged to be spaced apart from each other (e.g., to be spaced apart from each other by a set or predetermined distance).

In an example embodiment in which each of a first sidewall 100-1 and a second sidewall 100-2 has three areas, the number of the shape maintaining parts 205-1 may be three which may be fastened to the three corresponding areas, respectively.

In an example embodiment in which each of a first sidewall 100-1 and a second sidewall 100-2 has edge areas 260-2 and 260-3 and a central area 260-1, a shape maintaining part 205-1 may be disposed at each area (e.g., at each edge area 260-2 and 260-3 and at the central area 260-1).

In an example embodiment, a plurality of areas of the first sidewall 100-1 and the second sidewall 100-2 may be curved, each having different curvatures.

In an example embodiment, the edge areas 260-2 and 260-3 and the central area 260-1 may have curvatures that are different from each other. In this embodiment, however, the respective edge areas 260-2 and 260-3 may have the same curvature.

For the sake of convenient explanation, the first sidewall 100-1 and the second sidewall 100-2 each having three areas are illustrated, but the number of areas of each sidewall is not limited thereto. For example, each of the first sidewall 100-1 and the second sidewall 100-2 may be divided into n areas, and curvatures of the respective n areas may be different from each other.

Figure 11:
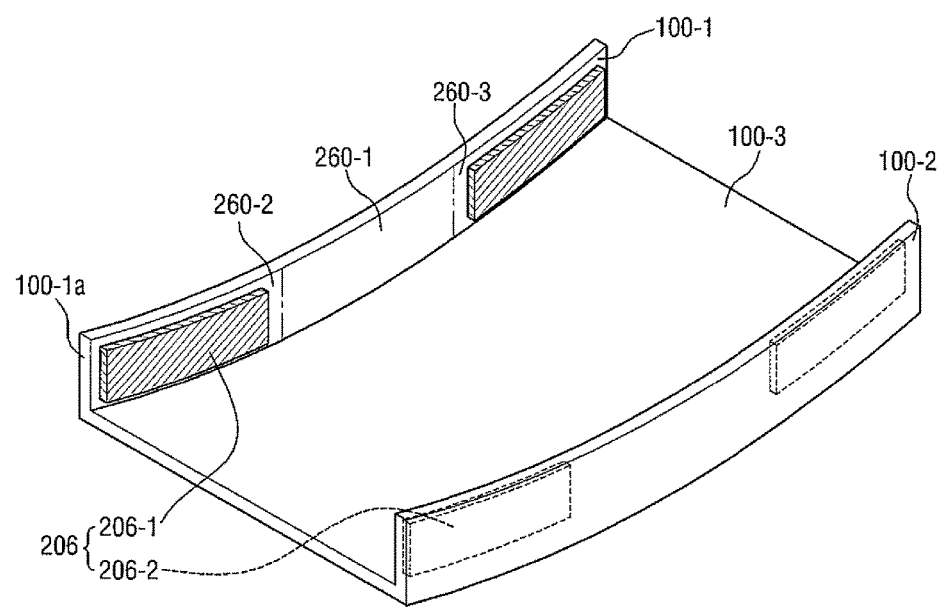
FIG. 11 is a partial perspective view of a display chassis according to another embodiment of the present invention.

FIG. 11 is a partial perspective view of a display chassis according to another embodiment of the present invention.

Referring to FIG. 11, the display chassis according to another embodiment of the present invention is different from the display chassis shown in FIG. 9 in that shape maintaining parts are disposed at only edge areas.

In an example embodiment, the shape maintaining parts 206-1 may be disposed at only edge areas 260-2 and 260-3 and not at a central area 260-1. As described above, a curvature of the central area 260-1 may be different from curvatures of the edge areas 260-2 and 260-3. In an example embodiment, the curvatures of the edge areas 260-2 and 260-3 may be greater than the curvature of the central area 260-1. In this case, the spring back may be more apparent (e.g., stronger) at the edge areas 260-2 and 260-3 than at the central area 260-1. Therefore, in a case where the shape maintaining parts 206-1 are disposed at the edge areas 260-2 and 260-3, the curvatures of the edge areas 260-2 and 260-3 are maintained at a constant level, thereby preventing a spring-back phenomenon from occurring to a bottom part 100-3.

Figure 12:
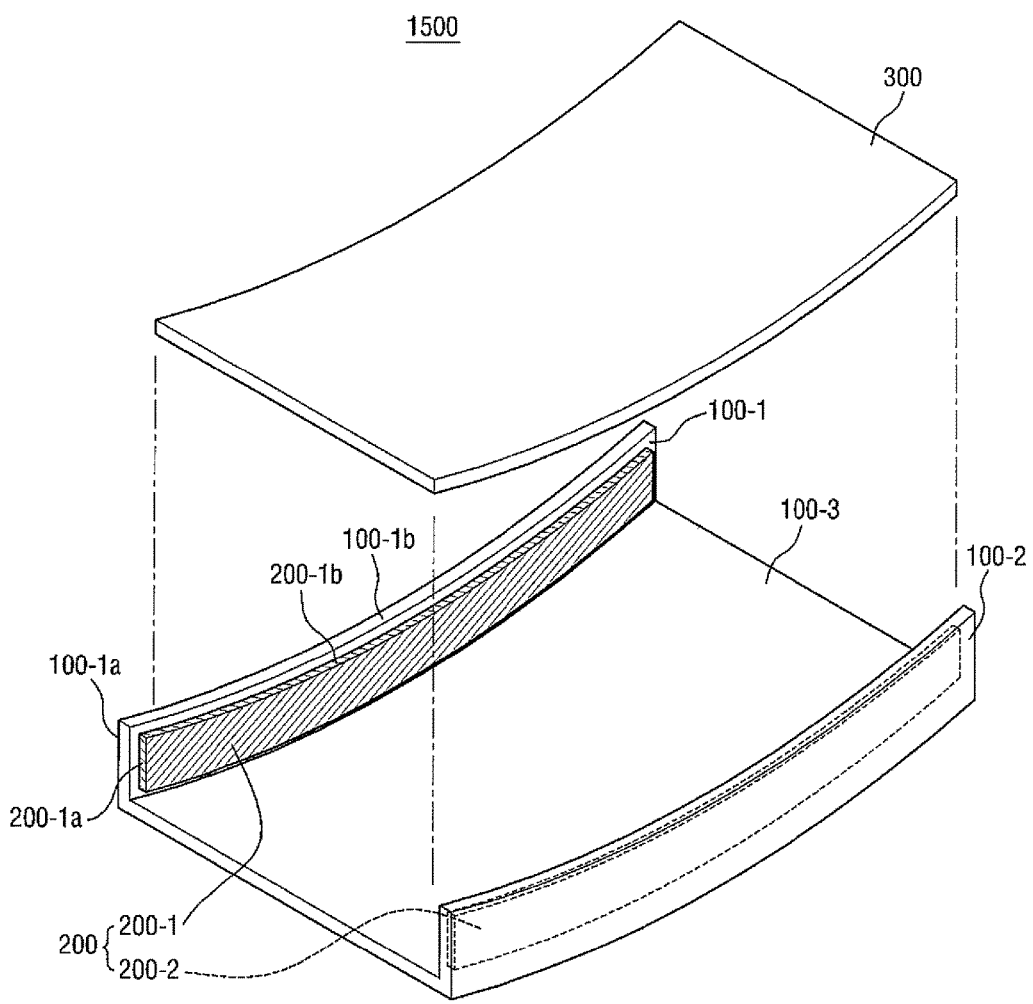
FIG. 12 is a partially exploded perspective view of a display device according to an embodiment of the present invention.

FIG. 12 is a partially exploded perspective view of a display device according to an embodiment of the present invention.

Referring to FIG. 12, a display device 1500 according to an embodiment of the present invention includes a chassis (e.g., a display chassis or a bottom chassis) and a display panel 300 accommodated in the chassis. In this embodiment, the chassis may include a bottom part 100-3 having a curved surface, a first sidewall and a second sidewall extending from opposite side ends of the bottom part 100-3 and facing each other, and shape maintaining parts maintaining shapes of the first sidewall and the second sidewall and respectively contacting the first sidewall and the second sidewall.

The chassis may be substantially the same as the aforementioned display chasses according to one or more embodiments of the present invention and a detailed description thereof may not be given.

The display panel 300 may be disposed on the chassis. The display panel 300 may refer to a display panel for displaying an image and examples thereof may include a liquid crystal display (LCD) panel, an electrophoretic display panel, an organic light emitting diode (OLED) panel, a light emitting diode (LED) panel, an inorganic electro luminescent (EL) display panel, a field emission display (FED) panel, a surface-conduction electron-emitter display (SED) panel, a plasma display panel (PDP), and a cathode ray tube (CRT) display panel, but the present invention is not limited thereto. In addition, the concept of a display panel may be understood to encompass not only a rigid panel but also a flexible panel that is bendable, foldable, and/or rollable.

In an example embodiment, the display panel 300 may be curved with a constant curvature. In an example embodiment, the display panel 300 may have substantially the same curvature as the bottom part 100-3 of the chassis, but aspects of the present invention are not limited thereto.

The display panel 300 may be a flexible display panel and/or a variable display panel that is capable of adjusting its curved state to a planar state (and/or vise versa), but aspects of the present invention are not limited thereto. The display panel 300 may be a fixed display panel whose shape is maintained in a curved state.

Figure 13:
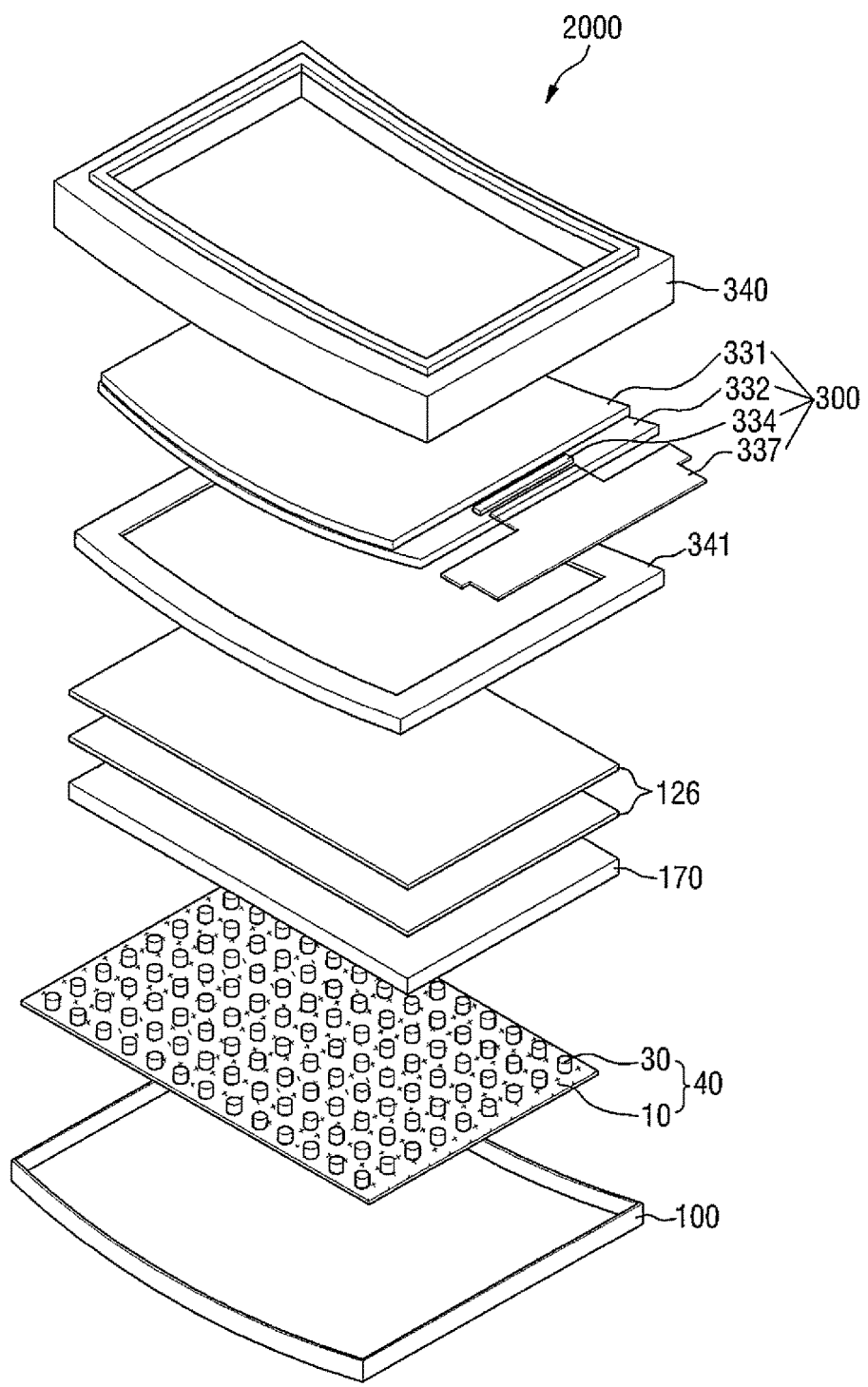
FIG. 13 is a partially exploded perspective view of a display device according to another embodiment of the present invention.

FIG. 13 is a partially exploded perspective view of a display device according to another embodiment of the present invention.

FIG. 13 illustrates an embodiment in which a display device 2000 according to another embodiment of the present invention is a direct lit liquid crystal display.

Referring to FIG. 13, the display device 2000 according to another embodiment of the present invention may include a display chassis (e.g., a bottom or rear chassis), a backlight unit 40 disposed on the chassis, a diffusion plate 170 disposed on the backlight unit 40, and a display panel 300 disposed on the diffusion plate 170.

In an example embodiment, the backlight unit 40 may include a reflection plate 10 and a light source unit 30 disposed on the reflection plate 10. The reflection plate 10 reflects light traveling toward a lower portion of the backlight unit 40 toward an upper portion of the backlight unit 40. The reflection plate 10 may be made of, for example, polyethylene terephthalate (PET) but is not limited thereto.

The light source unit 30 may be disposed on the reflection plate 10. The light source unit 30 may supply light to the display panel 300. In an example embodiment, the light source unit 30 may include a plurality of light source units which may be arranged in a matrix configuration. For example, the light source unit 30 may include a plurality of point light sources.

In an example embodiment, the light source unit 30 may include a light emitting diode (LED). The light source unit 30 may generate blue, red, green, and/or ultraviolet wavelength light. The light source unit 30 may be a single LED or may be a plurality of LEDs arranged in combination.

In another example embodiment, the light source unit 30 may include a cold cathode fluorescent lamp (CCFL) or an external electrode fluorescent lamp (EEFL), which is, however, provided only for illustration. The present invention does not limit the kind of the light source unit 30 to those listed herein.

The diffusion plate 170 may be disposed on the light source unit 30. The diffusion plate 170 diffuses some of the light irradiated from the backlight unit 40, transmits some of the light to the display panel 300 disposed on the diffusion plate 170, and reflects some of the light toward the lower portion of the diffusion plate 170. In an example embodiment, the diffusion plate 170 may be made of at least one selected from the group consisting of polymethyl methacrylate (PMMA), polystyrene (PS), polycarbonate (PC), cyclic-olefin copolymers (COC), polyethylene terephthalate (PET), polybutylene terephthalate (PBT), and a plastic alloy, but the present invention does not limit the material of the diffusion plate 170 to those listed herein. In addition, the diffusion plate 170 may be formed of a single layer but is not limited thereto. The diffusion plate 170 may have a stacked structure including multiple layers.

One or more optical sheets 126 for modulating optical characteristics of the light transmitted through the diffusion plate 170 and a mold frame 341 accommodating the one or more optical sheets 126 may be disposed on the diffusion plate 170.

In one embodiment, the mold frame 341 may support and fix the display panel 300 while contacting a periphery of the display panel 300. In an example embodiment, the periphery of the display panel 300 may be a non-display area of the display panel 300. For example, at least a portion of the mold frame 341 may overlap the non-display area of the display panel 300. The display area and the non-display area of the display panel 300 will be further described later.

The display panel 300 may include the display area and the non-display area. In addition, the display panel 300 may include a first substrate 331, a second substrate 332 facing the first substrate 331, a liquid crystal display, a driver 334, and a printed circuit board 337 attached to the first substrate 331.

The display area of the display panel 300 may be an area at which an image is displayed, and the non-display area of the display panel 300 may be an area at which an image is not displayed. In an example embodiment, the display area may be positioned at a central portion of an overlapping portion of the first substrate 331 and the second substrate 332, and the non-display area may be positioned at a peripheral portion of the overlapping portion of the first substrate 331 and the second substrate 332. In addition, the display area of the display panel 300 may not overlap a top chassis 340, and the non-display area of the display panel 300 may overlap with the top chassis 340. In addition, a shape of the display area may be similar to that of the second substrate 332, but an internal area of the display area may be less than that of the second substrate 332. In addition, boundary lines of the display area and the non-display area may be parallel with sides of the second substrate 332 facing the display area and the non-display area. A shape formed by the boundary lines of the display area and the non-display area may be rectangular.

At least a portion of the first substrate 331 may overlap the second substrate 332. A central portion of the overlapping area of the first substrate 331 and the second substrate 332 may correspond to the display area, and a peripheral portion of the overlapping area of the first substrate 331 and the second substrate 332 may correspond to the non-display area. The driver 334 and the printed circuit board 337 may be attached to the non-overlapping area of the first substrate 331 and the second substrate 332.

The second substrate 332 may be disposed to face the first substrate 331. A liquid crystal layer may be interposed between the first substrate 331 and the second substrate 332. A sealing member, such as a sealant, may be provided between the first substrate 331 and the second substrate 332 along peripheral portions of the first substrate 331 and the second substrate 332, thereby joining the first substrate 331 and the second substrate 332 with each other and sealing the same.

The first substrate 331 and the second substrate 332 may have a rectangular parallelepiped shape. For the sake of convenient explanation, the first substrate 331 and the second substrate 332 are illustrated as each having a rectangular parallelepiped shape, but aspects of the present invention are not limited thereto. The first substrate 331 and the second substrate 332 may have various shapes according to the shape of the display panel 300.

The driver 334 may apply various suitable kinds of signals, including driving signals, required to display an image at the display area. The printed circuit board 337 may output various signals to the driver 334.

The top chassis 340 may be disposed on the display panel 300. The top chassis 340 may cover the periphery of the display panel 300 and may surround side surfaces of the display panel 300.

Figure 14:
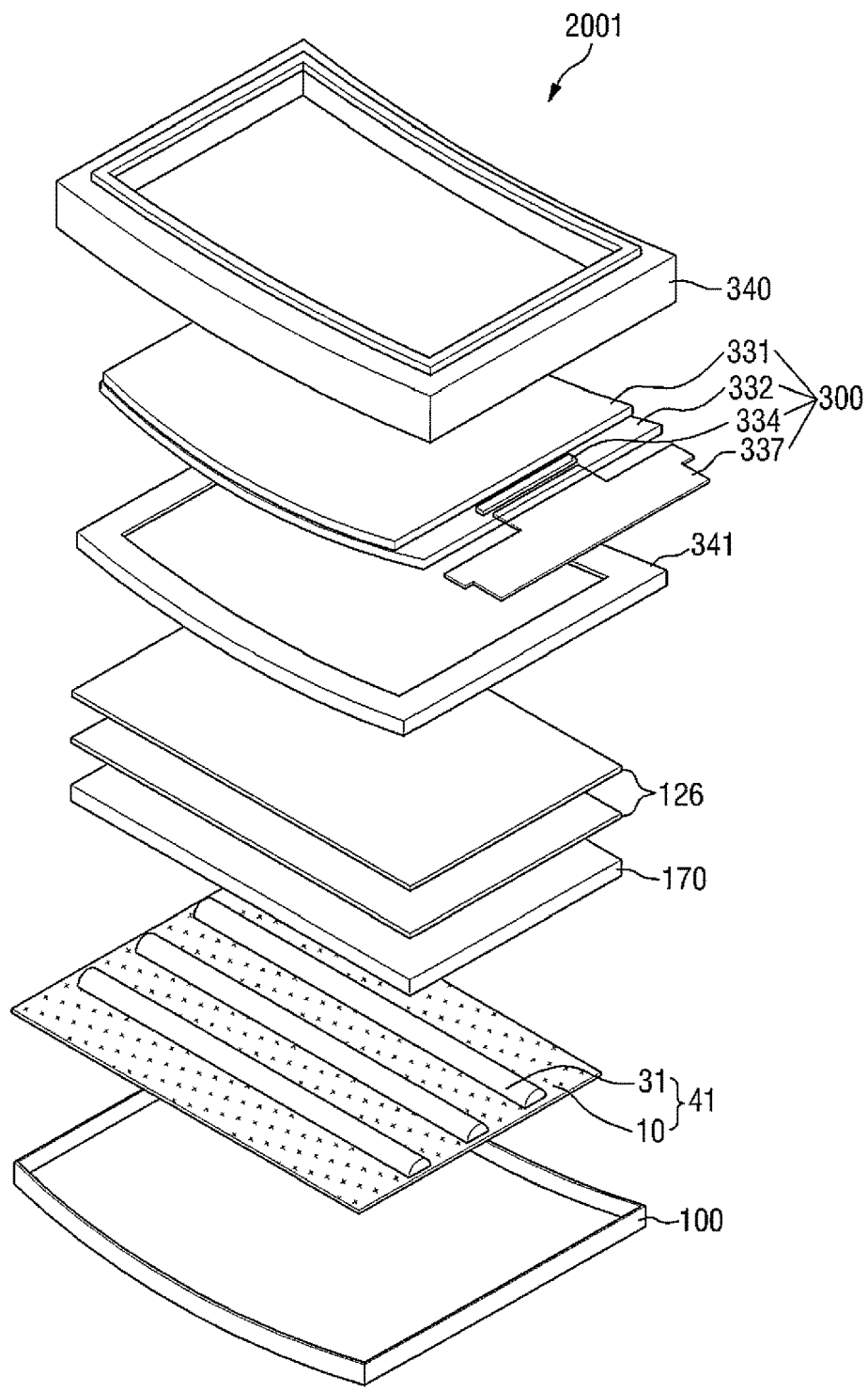
FIG. 14 is an exploded perspective view of a display device according to another embodiment of the present invention.

FIG. 14 is an exploded perspective view of a display device according to another embodiment of the present invention.

Referring to FIG. 14, a display device 2001 according to another embodiment of the present invention is different from the display device shown in FIG. 13 in that a backlight unit 41 includes a plurality of light source units 31 extending in one direction.

In an example embodiment, the plurality of light source units 31 are provided and may each have a line shape. For example, the plurality of light source units 31 extend in one direction, may be spaced apart from each other, and may be arranged to be parallel with each other.

Figure 15:
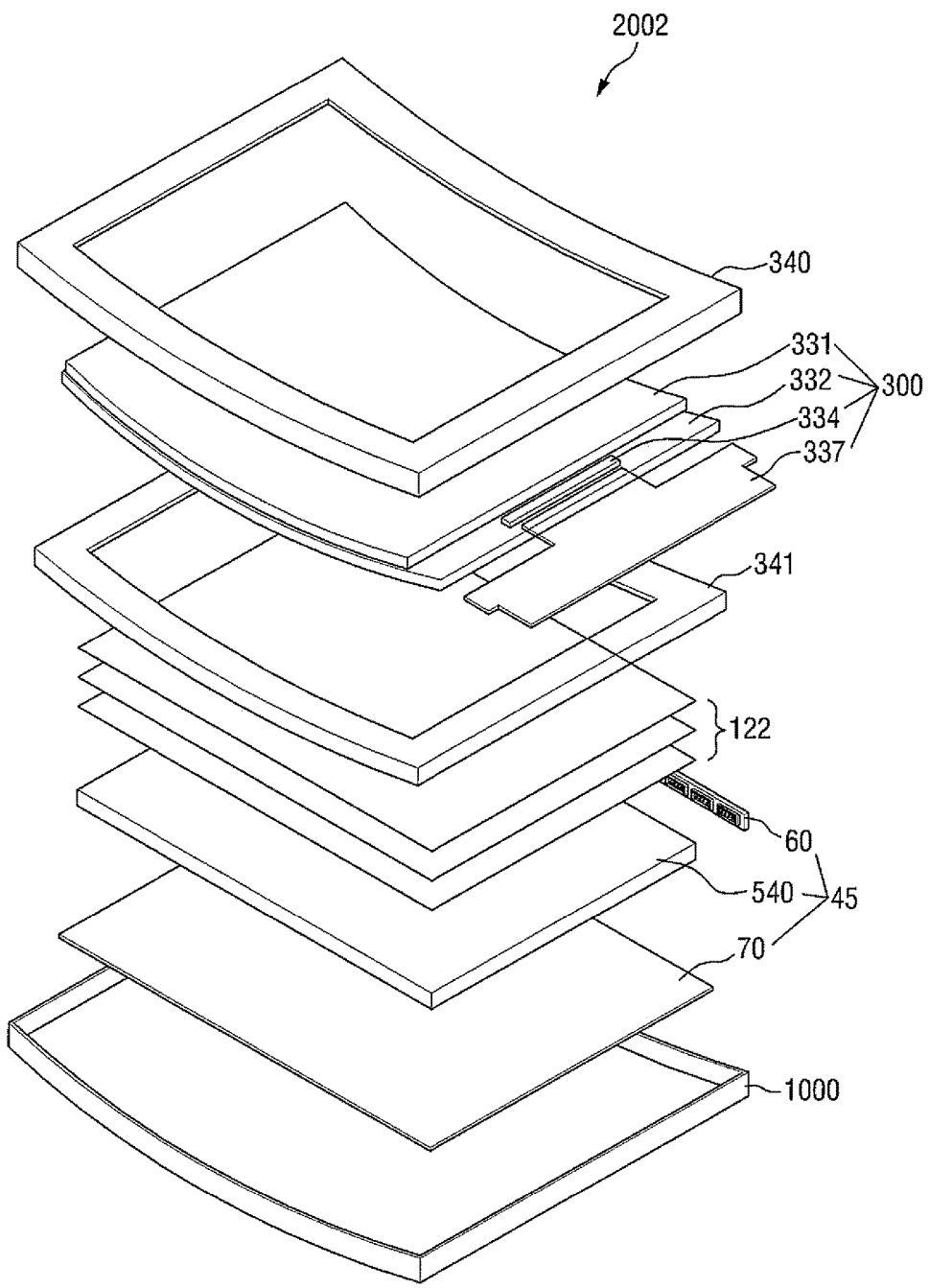
FIG. 15 is an exploded perspective view of a display device according to another embodiment of the present invention.

FIG. 15 is an exploded perspective view of a display device according to another embodiment of the present invention.

FIG. 15 illustrates a case in which a display device 2002 according to another embodiment of the present invention is an edge lit liquid crystal display.

The display device 2002 according to another embodiment of the present invention may include a chassis 1000 (e.g., a display or bottom chassis), a backlight unit 45 disposed on the chassis 1000, an optical sheet 122 disposed on the backlight unit 45, a mold frame 341 disposed on the optical sheet 122, and a display panel 300 disposed on the mold frame 341.

The chassis 1000 may be substantially the same as the aforementioned chasses according to one or more embodiments of the present invention, and a detailed description thereof may not be given.

The backlight unit 45 may include a light guide plate 540, a side light source unit 60 disposed at one side of the light guide plate 540, and a reflection sheet 70 disposed under the light guide plate 540.

The light guide plate 540 may be made of a transparent material. For example, the light guide plate 540 may be made of polycarbonate (PC), polymethyl methacrylate (PMMA), or the like. In some embodiments of the present invention, the light guide plate 540 may be flexible. The flexibility of the light guide plate 540 may be ascribed to a thickness, a shape, or a material of the light guide plate 540 as described above.

The side light source unit 60 may be disposed at one side of the light guide plate 540. For example, the side light source unit 60 may be disposed to be adjacent to one side surface of the light guide plate 540. The side light source unit 60 may include a body part and a light source unit disposed on the body part.

The light source unit may include one or more selected from the group consisting of a light emitting diode (LED), a cold cathode fluorescent lamp (CCFL), and an organic light emitting diode, which are, however, provided only for illustration, and aspects of the present invention are not limited thereto.

The reflection sheet 70 may be disposed under the light guide plate 540. The reflection sheet 70 may reflect the light emitted toward a bottom surface of the light guide plate 540 and may guide the reflected light to travel toward a top surface of the light guide plate 540. For example, the reflection sheet 70 may reflect the light that is not reflected by the light guide plate 540 toward the top surface of the light guide plate 540, thereby reducing a loss of the light.

The reflection sheet 70 may have a single layered structure but is not limited thereto. The reflection sheet 70 may have a stacked structure including at least two layers.

The reflection sheet 70 may be made of, for example, polyethylene terephthalate (PET), may be reflective, and may have one surface coated with a diffusion layer including, for example, titanium dioxide.

The reflection sheet 70 may be disposed to overlap with at least a portion of the bottom surface of the light guide plate 540.

One or more optical sheets 122 may be disposed on the reflection sheet 70. The one or more optical sheets 122, disposed on the light guide plate 540, may modulate optical characteristics of the light emitted from the light guide plate 540.

The mold frame 341 may be disposed on the optical sheets 122. The mold frame 341 may support and fix the display panel 300 while contacting a periphery of the display panel 300. In an example embodiment, the periphery of the display panel 300 may be a non-display area of the display panel 300. For example, at least a portion of the mold frame 341 may overlap the non-display area of the display panel 300.

The top chassis 340 may cover the periphery of the display panel 300 and may surround the display panel 300 and side surfaces of the display panel 300.

The display panel 300 may be substantially the same as the display panel shown in FIG. 13 and a detailed description thereof may not be given.

While the present invention has been particularly shown and described with reference to example embodiments thereof, it will be understood by those of ordinary skill in the art that various changes in form and details may be made to these example embodiments without departing from the spirit and scope of the present invention as defined by the following claims and their equivalents. It is therefore desired that the present embodiments be considered in all respects as illustrative and not restrictive, reference being made to the appended claims and their equivalents rather than the foregoing description to indicate the scope of the invention.

What is claimed is:

1. A display chassis comprising:
   a bottom part having a curved surface having a convex parabola cross-sectional shape when taken along an x-axis direction;
   a first sidewall and a second sidewall extending in a z-axis direction from opposite ends of the bottom part and facing each other in a y-axis direction; and shape maintaining parts configured to maintain shapes of the first sidewall and the second sidewall and contacting the first sidewall and the second sidewall, respectively, wherein each of the shape maintaining parts comprises a top portion and a center portion adjacent each other along the z-axis direction, wherein a distance between the top portions of the shape maintaining parts in the y-axis direction is the same as a distance between the center portions of the shape maintaining parts in the y-axis direction, wherein the first sidewall and the second sidewall each have long sides that are curved to be parallel with side ends of the bottom part and short sides at opposite ends of the long sides, and wherein the shape maintaining parts are at inner surfaces of the first sidewall and the second sidewall, respectively.

2. The display chassis of claim 1, wherein the shape maintaining parts comprise a first shape maintaining part contacting the first sidewall and a second shape maintaining part contacting the second sidewall.

3. The display chassis of claim 1, wherein curvatures of the long sides of the first sidewall and the second sidewall are the same as those of the opposite side ends of the bottom part.

4. The display chassis of claim 1, wherein the shape maintaining parts and the first and second sidewalls have the same shape.

5. The display chassis of claim 1, wherein each of the shape maintaining parts has long sides and short sides, and the long sides of the shape maintaining parts have the same curvature as the long sides of the first and second sidewalls.

6. The display chassis of claim 1, wherein the first and second sidewalls have edge areas at respective ends along a length direction of the bottom part and a central area between the two edge areas, and the shape maintaining parts are at the central areas of the first and second sidewalls, respectively.

7. The display chassis of claim 6, wherein the shape maintaining parts each comprise three shape maintaining parts, and the three shape maintaining parts are at the edge areas and the central area of the first and second sidewalls, respectively.

8. The display chassis of claim 1, wherein the first and second sidewalls each have edge areas and a central area between the two edge areas, and the shape maintaining parts are at only the edge areas of the first and second sidewalls, respectively.

9. The display chassis of claim 1, wherein the shape maintaining parts comprise a metal material.

10. A display device comprising:
a display chassis; and
a display panel on the chassis,
wherein the chassis comprises:
a bottom part having a curved surface having a convex parabola cross-sectional shape when taken along an x-axis direction;
a first sidewall and a second sidewall extending in a z-axis direction from opposite ends of the bottom part and facing each other in a y-axis direction; and
shape maintaining parts configured to maintain shapes of the first sidewall and the second sidewall and contacting the first sidewall and the second sidewall, respectively, wherein each of the shape maintaining parts comprises a top portion and a center portion adjacent each other along the z-axis direction, and wherein a distance between the top portions of the shape maintaining parts in the y-axis direction is the same as a distance between the center portions of the shape maintaining parts in the y-axis direction, wherein the first sidewall and the second sidewall have long sides that are curved to be parallel with side ends of the bottom part and short sides at opposite ends of the long sides, and wherein the shape maintaining parts are at inner surfaces of the first sidewall and the second sidewall, respectively.

11. The display device of claim 10, further comprising a backlight unit on the chassis.

12. The display device of claim 11, wherein the backlight unit comprises a reflection plate and a light source unit on the reflection plate.

13. The display device of claim 11, wherein the backlight unit comprises a reflection sheet, a light guide plate on the reflection sheet, and a side light source unit at a side of the light guide plate.

14. The display device of claim 10, wherein curvatures of the long sides of the first sidewall and the second sidewall are the same as that of the opposite side ends of the bottom part.

15. The display device of claim 10, wherein the shape maintaining parts and the first and second sidewalls have the same shape.

16. The display device of claim 10, wherein the shape maintaining parts comprise a metal material.

* * * * *